United States Patent
Do et al.

(10) Patent No.: US 11,316,237 B2
(45) Date of Patent: Apr. 26, 2022

(54) METHOD FOR MANUFACTURING SECONDARY BATTERY AND AUXILIARY CASE FOR MANUFACTURING SECONDARY BATTERY

(71) Applicant: LG Chem, Ltd., Seoul (KR)

(72) Inventors: Jin Uk Do, Daejeon (KR); Je Jun Lee, Daejeon (KR); Sang Suk Jung, Daejeon (KR); Min Ki Jo, Daejeon (KR)

(73) Assignee: LG Energy Solution, Ltd.

( * ) Notice: Subject to any disclaimer, the term of this patent is extended or adjusted under 35 U.S.C. 154(b) by 143 days.

(21) Appl. No.: 16/335,132

(22) PCT Filed: May 23, 2018

(86) PCT No.: PCT/KR2018/005853
§ 371 (c)(1),
(2) Date: Mar. 20, 2019

(87) PCT Pub. No.: WO2018/217015
PCT Pub. Date: Nov. 29, 2018

(65) Prior Publication Data
US 2019/0229322 A1    Jul. 25, 2019

(30) Foreign Application Priority Data

May 24, 2017    (KR) .................. 10-2017-0064272

(51) Int. Cl.
*H01M 50/60*    (2021.01)
*H01M 4/04*    (2006.01)
(Continued)

(52) U.S. Cl.
CPC .............. *H01M 50/60* (2021.01); *H01M 4/04* (2013.01); *H01M 4/0447* (2013.01); *H01M 10/04* (2013.01); *H01M 50/30* (2021.01)

(58) Field of Classification Search
CPC ................................................ H01M 10/4214
See application file for complete search history.

(56) References Cited

U.S. PATENT DOCUMENTS

| 9,425,479 B2 | 8/2016 | Kim |
| 2011/0151312 A1 | 6/2011 | Kim |

(Continued)

FOREIGN PATENT DOCUMENTS

| CN | 103988335 A | 8/2014 |
| CN | 105164831 A | 12/2015 |

(Continued)

OTHER PUBLICATIONS

JP2013178950A_Description_202102241633_Machine_Translation.pdf (Year: 2013).*

(Continued)

*Primary Examiner* — Brian R Ohara
*Assistant Examiner* — Patrick Marshall Greene
(74) *Attorney, Agent, or Firm* — Lerner, David, Littenberg, Krumholz & Mentlik, LLP

(57) ABSTRACT

Disclosed are a method for manufacturing a secondary battery and an auxiliary case configured for use during manufacturing of the secondary battery. A gas generated in the secondary battery may be discharged to prevent an electrode assembly and the secondary battery from increasing in thickness, and an electrolyte may be efficiently injected into the secondary battery. A method for manufacturing a secondary battery includes: an accommodation step of accommodating an electrode assembly into a battery case; a connection step of connecting an auxiliary case to the battery case, the auxiliary case having an inner space therein; an injection step of injecting an electrolyte into the battery case and the auxiliary case; an electrolyte supply step of moving some of the electrolyte from the auxiliary case (Continued)

into the battery case; and a gas supply step of moving a gas from the battery case into the auxiliary case.

11 Claims, 3 Drawing Sheets

(51) Int. Cl.
*H01M 10/04* (2006.01)
*H01M 50/30* (2021.01)

(56) References Cited

U.S. PATENT DOCUMENTS

| | | |
|---|---|---|
| 2012/0021259 A1 | 1/2012 | Kim et al. |
| 2012/0208052 A1 | 8/2012 | Kim |
| 2014/0287279 A1 | 9/2014 | Kim et al. |
| 2016/0020452 A1 | 1/2016 | Choi et al. |
| 2016/0079579 A1* | 3/2016 | Jung ............ H01M 50/342 429/56 |
| 2016/0133914 A1 | 5/2016 | Oh et al. |
| 2016/0172648 A1 | 6/2016 | Park et al. |

FOREIGN PATENT DOCUMENTS

| | | |
|---|---|---|
| EP | 2393146 A1 | 12/2011 |
| JP | H04106879 A | 4/1992 |
| JP | 4967650 B2 | 7/2012 |
| JP | 2013178950 A | 9/2013 |
| JP | 2014022336 A | 2/2014 |
| JP | 2015125942 A | 7/2015 |
| JP | 2015133179 A | 7/2015 |
| JP | 2017033691 A | 2/2017 |
| KR | 20070065540 A | 6/2007 |
| KR | 100864694 B1 | 10/2008 |
| KR | 20090020888 A | 2/2009 |
| KR | 20100051403 A | 5/2010 |
| KR | 20110072910 A | 6/2011 |
| KR | 101106323 B1 | 1/2012 |
| KR | 20120092368 A | 8/2012 |
| KR | 20130038655 A | 4/2013 |
| KR | 101273472 B1 | 6/2013 |
| KR | 20140119007 A | 10/2014 |
| KR | 20160010823 A | 1/2016 |
| KR | 101613499 B1 | 4/2016 |
| KR | 101675012 B1 | 11/2016 |
| WO | 2010053256 A2 | 5/2010 |
| WO | 2014097906 A1 | 6/2014 |

OTHER PUBLICATIONS

JP2015133179A_Description_202102241607_machine_translation. pdf (Year: 2015).*
International Search Report for Application No. PCT/KR2018/ 005853 dated Sep. 10, 2018.
Extended European Search Report with written opinion for Application No. PCT/KR2018/005853 dated Sep. 26, 2019, 8 pages.
Chinese Search Report for Application No. 201880003867.9, dated Jul. 6, 2021, 2 pages.

* cited by examiner

METHOD FOR MANUFACTURING SECONDARY BATTERY AND AUXILIARY CASE FOR MANUFACTURING SECONDARY BATTERY

CROSS-REFERENCE TO RELATED APPLICATION

The present application is a national phase entry under 35 U.S.C. § 371 of International Patent Application No. PCT/KR2018/005853, filed on May 23, 2018, published in Korean, which claims priority from Korean Patent Application No 10-2017-0064272, filed on May 24, 2017, the disclosures of which are hereby incorporated by reference herein.

TECHNICAL FIELD

The present invention relates to a method for manufacturing a secondary battery and an auxiliary case for manufacturing a secondary battery, and more particularly, to a method for manufacturing a secondary battery, in which a gas generated in the secondary battery is effectively discharged, and an electrolyte is sufficiently injected into the secondary battery, and an auxiliary case for manufacturing the secondary battery.

BACKGROUND ART

In general, a secondary battery that is repeatedly chargeable and dischargeable includes an electrode assembly including an electrode and a separator, a case accommodating the electrode assembly, and an electrolyte provided in the case to form the electrode assembly.

Such a secondary battery is manufactured by accommodating an electrode assembly into a case and injecting an electrolyte into the case. The manufactured secondary battery is subjected to a formation step before the secondary battery is used in earnest. In the formation step, the electrode assembly within the secondary battery is charged.

In the formation step, a gas is generated in the secondary battery. As a result, the electrode assembly may increase in thickness due to the generated gas. Particularly, in case of a can-type secondary battery, the electrode assembly itself may increase in thickness due to twist of the electrode assembly, and also, the case of the secondary battery may further increase in thickness due to the gas within the secondary battery, which is generated in the formation step.

Although a separate degassing process is performed to discharge the gas, the gas within the secondary battery may not be sufficiently discharged through only the degassing process.

Particularly, in the case of the can-type secondary battery, in order to prevent moisture and the like from being permeated due to the nature of the manufacturing process, only a process of discharging a gas generated in a pre-formation step is performed after the pre-formation step in which only a small amount of electrode assembly is charged in the process of manufacturing the secondary battery, and a separate degassing process is not performed (this is because the pre-formation step in the process of manufacturing the can-type secondary battery is performed when the secondary battery exists in an assembly line). In the case of the can-type secondary battery, it is difficult to treat the gas generated in the formation state, which is performed after the secondary battery is completely assembled.

In order to improve capacity of the secondary battery, it is necessary to sufficiently inject the electrolyte into the secondary battery. For this, the electrolyte has to be sufficiently permeated into pores of an electrode and a separator, which constitute the electrode assembly. However, a predetermined time or more is required for being taken to sufficiently permeate the electrolyte into the pores of the electrode and the separator. This serves as a factor for increasing the time required for manufacturing the secondary battery.

Particularly, in case of a pouch-type secondary battery, a necessary amount of electrolyte may be sufficiently injected into a case having a space larger than that of a final-type secondary battery, and then, a portion of the case may be cut to manufacture the secondary battery. On the other hand, in case of the can-type secondary battery, unlike the pouch-type secondary battery, a case may be fixed in size, and thus, an amount of electrolyte to be injected may be limited.

DISCLOSURE OF THE INVENTION

Technical Problem

Therefore, an object of the present invention is to provide a method for manufacturing a secondary battery, in which a gas generated in the secondary battery is effectively discharged to prevent an electrode assembly and the secondary battery from increasing in thickness.

Another object of the present invention is to provide a method for manufacturing a secondary battery, in which an electrolyte is efficiently injected into the secondary battery.

Technical Solution

To achieve the above object, according to an aspect of the present invention, a method for manufacturing a secondary battery includes: an accommodation step of accommodating an electrode assembly into a battery case; a connection step of connecting an auxiliary case to the battery case, the auxiliary case having an inner space therein; an injection step of injecting an electrolyte into the battery case and the auxiliary case; an electrolyte supply step of moving some of the electrolyte from the auxiliary case into the battery case; and a gas supply step of moving a gas from the battery case into the auxiliary case.

During the injection step, the electrolyte may be injected into the battery case and the auxiliary case through an injection hole formed in the battery case.

The method may include a formation step in which the secondary battery is electrically charged and discharged to allow the secondary battery to achieve a usable state, and the formation step may be performed before the gas supply step, wherein the gas may comprise a gas generated during the formation step.

At least a portion of the electrolyte supply step and at least a portion of the gas supply step may be performed at the same time.

The electrolyte supply step may include a process of raising the auxiliary case at least partially above the battery case, such that gravity contributes to the moving of the some of the electrolyte from the auxiliary case into the battery case.

The electrolyte supply step may include a process of pumping some of the electrolyte from the auxiliary case into the battery case.

The method may further include a separating step of separating the auxiliary case from the battery case and, after the separating step, a sealing step of sealing the battery case.

During the electrolyte supply step and the gas supply step, some of the electrolyte and the gas may be moved between the battery case and the auxiliary case through a single path.

During the electrolyte supply step and the gas supply step, some of the electrolyte and the gas may be moved between the battery case and the auxiliary case through separate respective paths.

A discharge hole for discharging a fluid may be provided in the auxiliary case, and the method may further include a discharge step of discharging a fluid out of the auxiliary case to the outside through the discharge hole.

At least a portion of the fluid discharged during the discharge step may include the gas.

The method may further include a separating step of separating the auxiliary case from the battery case and, after the separating step, a sealing step of sealing the battery case, wherein the sealing step may be performed after the discharge step.

To achieve the above object, according to another aspect of the present invention, an auxiliary case for manufacturing a secondary battery includes: an auxiliary body constituting a main body of the auxiliary case; and a connection part providing fluid communication between an inner space within the auxiliary body and an inner space within the secondary battery, wherein the connection part is configured to serve as a path through which an electrolyte within the auxiliary body is configured to be supplied into the secondary battery or a path through which a gas within the secondary battery is configured to be supplied into the auxiliary body.

The gas may include a gas generated during charging and discharging of the secondary battery to achieve a usable state.

The auxiliary case may further include a pumping unit configured to pump the electrolyte from the inner space of the auxiliary body to the inner space of the secondary battery.

The connection part may include a first connection part and a second connection part, wherein the first connection part may be configured to receive the electrolyte therethrough from the inner space of the auxiliary body to the inner space of the secondary battery, and the second connection part may be configured to receive the gas therethrough from the inner space of the secondary battery to the inner space of the auxiliary body.

A discharge hole for discharging a fluid may be formed in the auxiliary body, and the fluid within the auxiliary body may be discharged to the outside through the discharge hole.

At least a portion of the fluid discharged through the discharge hole may include the gas.

Advantageous Effects

According to the present invention, in the process of manufacturing the secondary battery, the gas generated in the secondary battery may be effectively discharged to prevent the electrode assembly and the secondary battery from increasing in thickness.

Also, according to the present invention, in the process of manufacturing the secondary battery, the electrolyte may be efficiently injected into the secondary battery.

MODE FOR CARRYING OUT THE INVENTION

Hereinafter, a structure of an auxiliary case for manufacturing a secondary battery according to the present invention will be described with reference to the accompanying drawings.

Auxiliary Case for Manufacturing Secondary Battery

Figure 1:
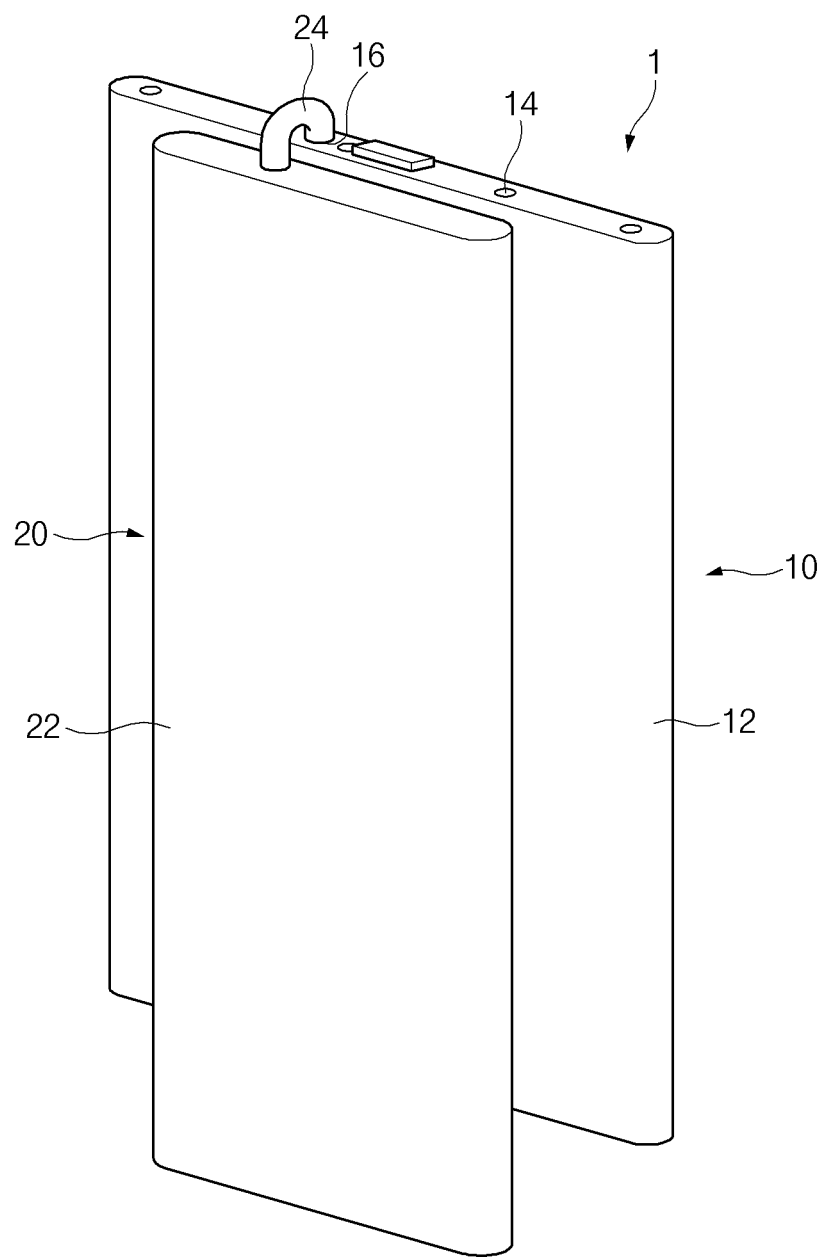
FIG. 1 is a perspective view of a secondary battery and an auxiliary case for manufacturing the secondary battery according to a first embodiment of the present invention.

FIG. 1 is a perspective view of a secondary battery and an auxiliary case for manufacturing the secondary battery according to a first embodiment of the present invention.

Referring to FIG. 1, a secondary battery 1 may include a battery case 10. Here, the battery case 10 may be a can-type case. Also, the battery case 10 may include a battery body 12 constituting a main body of the battery case 10.

An injection hole 14 may be formed in the battery body 12. An electrolyte may be injected into an inner space of the battery body 12 through the injection hole 14.

Also, a connection hole 16 may be formed in the battery body 12. As described below, a gas or the electrolyte within the secondary battery 1 may move between the battery case 10 and an auxiliary case 20 through the connection hole 16.

The auxiliary case for manufacturing the secondary battery according to the first embodiment of the present invention may include an auxiliary body 22 constituting a main body of the auxiliary case 20. A space may be formed in the auxiliary body 22. Also, the auxiliary case 20 for manufacturing the secondary battery according to the first embodiment of the present invention may include a connection part 24 connecting the auxiliary body 22 to the secondary battery 1. According to the first embodiment of the present invention, the electrolyte within the auxiliary body 22 may be supplied into the secondary battery 1 through the connection part 24, and the gas within the secondary battery 1 may be supplied into the auxiliary body 22 through the connection part 24. Thus, according to the first embodiment of the present invention, in the process of manufacturing the secondary battery, the gas within the secondary battery may be discharged, and thus, a sufficient amount of electrolyte may be injected into the secondary battery for a sufficient time.

At least a portion of the gas within the secondary battery 1 may be a gas generated in a formation step in which the secondary battery 1 is electrically charged and discharged to allow the secondary battery 1 to become a usable state. Thus, according to the first embodiment of the present invention, the gas generated in the formation step for the secondary battery may be discharged to the outside of the secondary battery to prevent the secondary battery or the electrode assembly from increasing in thickness due to the gas generated in the formation step.

The auxiliary case 20 according to the first embodiment of the present invention may further include a pumping unit (not shown) for pumping the electrolyte within the auxiliary body 22 to supply the electrolyte into the secondary battery 1. The pumping unit may be provided inside the auxiliary body 22 or provided outside the auxiliary body 22. The electrolyte within the auxiliary body 22 of the auxiliary case 20 may be efficiently supplied into the secondary battery 1 by the pumping unit.

Figure 2:
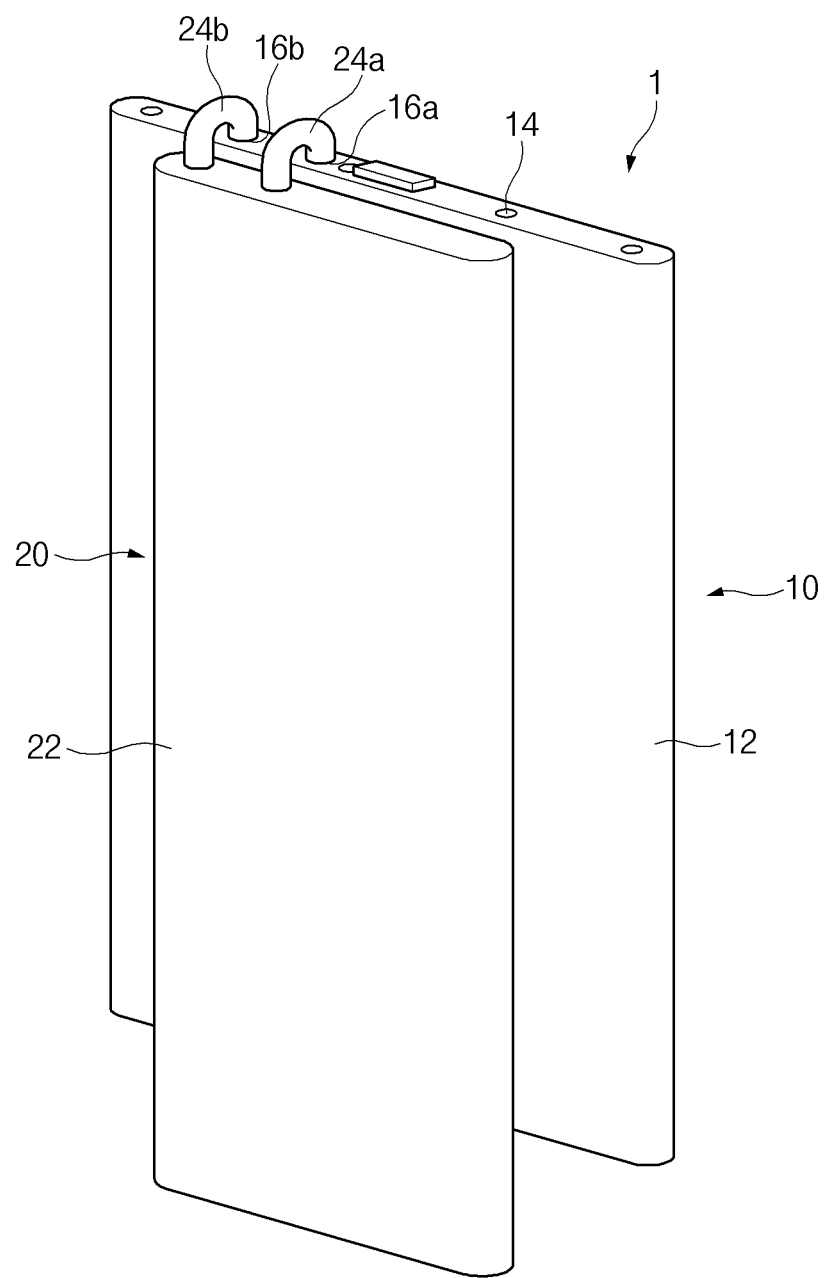
FIG. 2 is a perspective view of a secondary battery and an auxiliary case for manufacturing the secondary battery according to a second embodiment of the present invention.

FIG. 2 is a perspective view of a secondary battery and an auxiliary case for manufacturing the secondary battery according to a second embodiment of the present invention. A structure of an auxiliary case for a secondary battery according to the second embodiment of the present invention will be described with reference to constituents different from those of the auxiliary case for the secondary battery according to the first embodiment of the present invention.

Referring to FIG. 2, a plurality of connection holes may be formed in a battery body 12 of a secondary battery 1. FIG. 2 illustrates a case in which a first connection hole 16a and a second connection hole 16b are formed in the battery body 12 of the secondary battery.

Referring to FIG. 2, an auxiliary case for manufacturing the secondary battery 1 according to the second embodiment of the present invention may include a plurality of connection parts. That is, as illustrated in FIG. 2, the connection part 24 may include a first connection part 24a and a second connection part 24b. Here, the first connection part 24a may be connected to the first connection hole 16a, and the second connection part 24b may be connected to the second connection hole 16b. According to the second embodiment of the present invention, an electrolyte within an auxiliary body 22 of the auxiliary case 20 may be supplied into the secondary battery 1 through the first connection part 24a, and a gas within the secondary battery 1 may be supplied into the auxiliary body 22 through the second connection part 24b.

That is, according to the second embodiment of the present invention, a path through which the gas is transferred from the secondary battery 1 to the auxiliary case 20 and a path through which the electrolyte is transferred from the auxiliary case 20 to the secondary battery 1 may be individually formed to allow the gas and the electrolyte to smoothly flow without interfering with each other.

Figure 3:
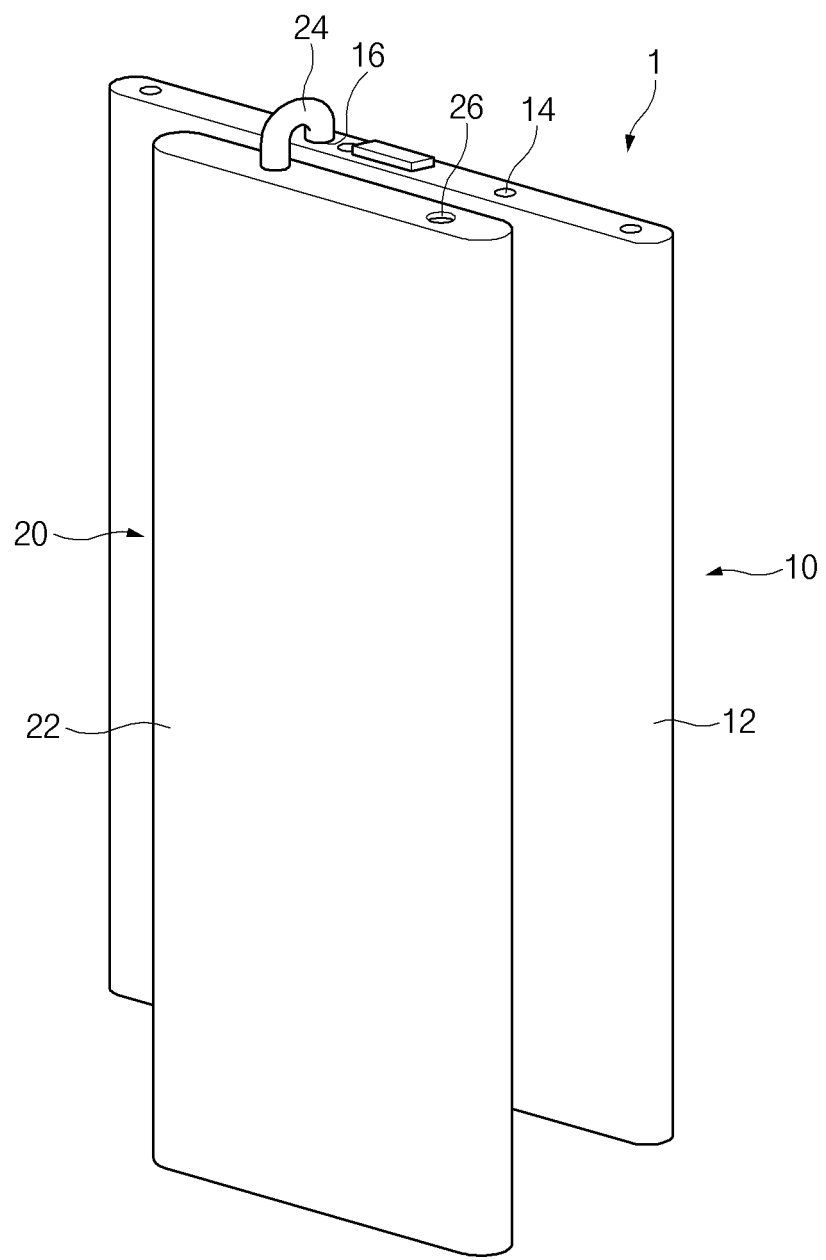
FIG. 3 is a perspective view of a secondary battery and an auxiliary case for manufacturing the secondary battery according to a third embodiment of the present invention.

FIG. 3 is a perspective view of a secondary battery and an auxiliary case for manufacturing the secondary battery according to a third embodiment of the present invention. A structure of an auxiliary case for a secondary battery according to the third embodiment of the present invention will be described with reference to constituents different from those of the auxiliary cases for the secondary batteries according to the first and second embodiments of the present invention.

Referring to FIG. 3, a discharge hole 26 for discharging a fluid may be formed in an auxiliary body 22 of an auxiliary case 20 for manufacturing the secondary battery according to the third embodiment of the present invention. According to the third embodiment of the present invention, the fluid within the auxiliary body 22 may be discharged through the discharge hole 26.

Here, at least a portion of the fluid discharged through the discharge hole 26 may be a gas generated in the secondary battery 1 in a formation step, i.e., a gas transferred into the auxiliary body 220 of the auxiliary case 20.

According to the third embodiment of the present invention, the gas, which is transferred into the auxiliary case 20, of the gas generated in the secondary battery 1 may be discharged to the outside to prevent the gas within the auxiliary case 20 from flowing back into the secondary battery 1.

Hereinafter, a method for manufacturing a secondary battery according to the present invention will be described with reference to the accompanying drawings.

Method for Manufacturing Secondary Battery

Referring to FIG. 1, a method for manufacturing a secondary battery 1 may include an accommodation step of accommodating an electrode assembly (not shown) into a battery case 10, a connection step of connecting an auxiliary case 20 forming an inner space to the battery case 10, an injection step of injecting an electrolyte into the battery case 10 and the auxiliary case 20, an electrolyte supply step of supplying the electrolyte within the auxiliary case 20 into the battery case 10, and a gas supply step of supplying a gas existing in the battery case 10 into the auxiliary case 20.

Here, at least a portion of the electrolyte supply step and at least a portion of the gas supply step may be performed at the same time. For example, the electrolyte supply step and the gas supply step may be performed at the same time.

In the injection step, the electrolyte may be injected into the battery case 10 and the auxiliary case 20 through an injection hole 14 formed in the battery case 10. Thus, in the injection step, the electrolyte may be injected into the auxiliary case 20 via the battery case 10.

At least a portion of the gas existing in the secondary battery 1 may be a gas generated in a formation step in which the secondary battery 1 is electrically charged and discharged to allow the secondary battery 1 to become a usable state. Also, the formation step may be performed before the gas supply step.

In order to quickly transfer the electrolyte within the auxiliary case 20 into the battery case 10 and prevent the electrolyte within the battery case 10 from flowing back to the auxiliary case 20 in the electrolyte supply step, the electrolyte supply step may include a process of pumping the electrolyte within the auxiliary case 20 to supply the electrolyte into the battery case 10. Alternatively, the electrolyte supply step may include a process of raising a height of the auxiliary case 20. Thus, since the auxiliary case 20 increases in height, the electrolyte within the auxiliary case 20 disposed at a relatively high position may be supplied into the battery case 10, which is disposed at a relatively low position, by the gravity.

In the electrolyte supply step and the gas supply step, the electrolyte and the gas may be supplied through one path. That is, as illustrated in FIG. 1, when one connection hole 16 is formed in the battery case 20, and one connection part 24 is provided in the auxiliary case 20, the electrolyte and the gas may be supplied through the one connection part 24. In this case, the auxiliary case may be simplified in structure.

Alternatively, in the electrolyte supply step and the gas supply step, the electrolyte and the gas may be supplied through separate paths, respectively. That is, as illustrated in FIG. 2, when two connection holes 16a and 16b are formed in the battery case 20, and two connection parts 24a and 24b are provided in the auxiliary case 20, the electrolyte may be supplied through one connection part, and the gas may be supplied through the other connection part. In this case, the gas and the electrolyte may smoothly flow without interfering with each other.

As illustrated in FIG. 3, a discharge hole 26 for discharging a fluid may be provided in the auxiliary case 20. Thus, the method for manufacturing the secondary battery according to the present invention may further include a discharge step of discharging the fluid within the auxiliary case 20 to the outside through the discharge hole 26. Also, at least a portion of the fluid discharged in the discharge step may be the gas within the secondary battery 1. When the discharge step is additionally performed, the gas transferred from the secondary battery 1 into the auxiliary case 20 may be discharged to the outside to prevent the gas transferred into the auxiliary case from flowing back into the secondary battery 1.

When the gas within the battery case 10 of the secondary battery 1 is sufficiently discharged, and the electrolyte is sufficiently injected between an electrode and a separator of an electrode assembly within the secondary battery 1, it is necessary to separate the auxiliary case 20 from the battery case 10. Thus, the method for manufacturing the secondary battery according to the present invention may further include a sealing step of sealing the connection hole 16 of the battery case 10 after the auxiliary case 20 is separated from the battery case 10. Here, the sealing step may be performed after the discharge step.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A method for manufacturing a secondary battery, the method comprising:
   an accommodation step of accommodating an electrode assembly into a battery case;
   a connection step of connecting at least one connection part of an auxiliary case to at least one connection hole of the battery case, the auxiliary case having an inner space therein communicating with the at least one connection part;
   while the at least one connection part is connected to the battery case, performing an injection step of injecting an electrolyte into both the battery case and the auxiliary case via an injection hole of the battery case, such that at least some of the electrolyte injected into the battery case via the injection hole is transferred to the auxiliary case via the at least one connection hole during the injection step;
   after the injection step, performing an electrolyte supply step of moving some of the electrolyte from the auxiliary case into the battery case; and
   a gas supply step of moving a gas from the battery case into the auxiliary case.

2. The method of claim 1, further comprising a formation step in which the secondary battery is electrically charged and discharged to allow the secondary battery to achieve a usable state, the formation step being performed before the gas supply step, wherein the gas comprises a gas generated during the formation step.

3. The method of claim 1, wherein at least a portion of the electrolyte supply step and at least a portion of the gas supply step are performed at the same time.

4. The method of claim 1, wherein the electrolyte supply step comprises a process of raising the auxiliary case at least partially above the battery case, such that gravity contributes to the moving of the some of the electrolyte from the auxiliary case into the battery case.

5. The method of claim 1, wherein the electrolyte supply step comprises a process of pumping the some of the electrolyte from the auxiliary case into the battery case.

6. The method of claim 1, further comprising:
   a separating step of separating the auxiliary case from the battery case; and
   after the separating step, a sealing step of sealing the battery case.

7. The method of claim 1, wherein, during the electrolyte supply step and the gas supply step, the some of the electrolyte and the gas are moved between the battery case and the auxiliary case through a single path.

8. The method of claim 1, wherein, during the electrolyte supply step and the gas supply step, the some of the electrolyte and the gas are moved between the battery case and the auxiliary case through separate respective paths.

9. The method of claim 1, wherein the auxiliary case includes a discharge hole for discharging a fluid, the discharge hole being separate from the at least one connection through which the electrolyte moves between the auxiliary case and the battery case,
   the method further comprising a discharge step of discharging a fluid out of the auxiliary case through the discharge hole.

10. The method of claim 9, wherein at least a portion of the fluid discharged during the discharge step comprises the gas.

11. The method of claim 9, further comprising:
   a separating step of separating the auxiliary case from the battery case; and
   after the separating step, a sealing step of sealing the battery case, wherein the sealing step is performed after the discharge step.

* * * * *